United States Patent Office 2,877,169
Patented Mar. 10, 1959

2,877,169

HYDROPHILIC DYE CYANIDES-HYDROXYALKYL COMPOUNDS

Lyman Chalkley, Prince Georges County, Md.

No Drawing. Application July 5, 1957
Serial No. 669,931

20 Claims. (Cl. 204—158)

The present invention relates to hydrophilic dye cyanides and, more particularly, to colorless hydrophilic dye cyanides of triphenylmethane dyes having at least one amino group para to the central methane carbon atom and at least one hydroxyalkyl radical attached to the nitrogen atom of such amino group.

It has long been known that certain of the triphenylmethane dyes which contain at least one amino group para to the central methane carbon atom form colorless, or nearly colorless, cyanides which in the presence of suitable organic activators become photosensitive to ultraviolet and shorter wave lengths of light to produce colored compounds but which are not sensitive to light in the visible range. Because of this property, the substances may be used in solution and absorbed or coated on a suitable base in the presence of an activator for the recording and measurement of ultraviolet radiation which has generally involved the use of expensive equipment to isolate this region, such as quartz spectrographs and photoelectric meters.

Papers prepared from one of the photosensitive compounds and an activator therefor may be used in photographic and photoduplication processes to print out images that are fully formed without development, that may be permanent and that may be examined in ordinary interior illumination without fixing. The papers employed retain their ultraviolet sensitivity after the printing of one image so that other portions may be printed on at a later date.

However, all of the known p-amino triphenylmethane dye cyanides have been hydrophobic in nature and are not activated by water so as to be photosensitive to ultraviolet and shorter wave lengths.

In my copending application, Serial Number 550,773, filed December 2, 1955, now abandoned, I have disclosed that new compounds which comprise p-amino triphenylmethane dye cyanides having in the molecule at least one hydrophilic group, such as the sulfonic acid, quaternary ammonium or hydroxyl group, are hydrophilic in character and that the potential sensitivity to ultraviolet radiation possessed by the known hydrophobic dye cyanides is not lost in the new compounds. In fact, unlike the previous hydrophobic p-amino triphenylacetonitriles, the new compounds are activated by water alone. It will be understood, of course, that more than one type of hydrophilic group may be present in the same molecule of dye cyanide. The p-amino groups may be primary, secondary, or tertiary in nature.

The present application relates to dye cyanides rendered hydrophilic by the addition of hydroxyalkyl groups to the amino radicals, and is a continuation-in-part of Serial Number 550,773. I have found that, unlike the hydrophilic dye cyanides containing ammonium salts or sulfonic acids, the dye cyanides having one or more hydroxyalkyl amino groups are nonionic. While all hydrophilic dye cyanides may be photoactivated by organic activators such as were disclosed in U. S. Patent No. 2,676,887, as well as by water, hydrocolloids, and the like, the ionic hydrophilic dye cyanides, such as those containing salts of sulfonic acids, are often quite insoluble in the non-aqueous types of photoactivators, and this insolubility presents obstacles to their practical use in hydrophobic systems. The non-ionic hydrophilic dye cyanides of the present invention, however, are soluble in a wide variety of organic photoactivators as well as having the property common to hydrophilic dye cyanides of being photo-activated by water and hydrocolloids.

Aside from their utility in aqueous and hydrocolloid systems, the hydroxyalkyl dye cyanides have marked advantages for use in hydrophobic systems because they are generally more soluble in nonaqueous photoactivating solvents than are their simple alkyl counterparts, such as Crystal Violet cyanide and Brilliant Green cyanide, which yield similar colors on photolysis.

Another advantage of the dye cyanides of the present application is that they provide a continuous series of photosensitizers capable of printing images varying in hue from a reddish magenta through the various degrees of magenta, purple, violet blue and blue green, all with the common property of photoactivation by a wide range of hydrophilic and hydrophobic photoactivators.

Accordingly, it is the object of the present invention to provide new triphenylacetonitriles having at least one amino group para to the central methane carbon atom which are hydrophilic and are activated, when dissolved in or wet with water, to form colored compounds on exposure to ultraviolet and shorter wave lengths.

Another object of the present invention is to provide new hydrophilic dye cyanides which are non-ionic and are soluble in a wide variety of solvents and photoactivators.

A further object of the invention is to provide a photochemical process utilizing the new hydrophilic dye cyanides.

A still further object of the invention is to provide methods for the production of the novel hydroxyalkylated p-amino dye cyanides and of mixtures of isomers and homologues thereof.

An example of the new type of dye cyanide is N,N,N',N',N'',N''-hexa - ($\beta$-hydroxyethyl)-p-rosaniline cyanide. When pure, this is a colorless, microcrystalline solid. It does not have a sharp melting point because it is decomposed by heat. When heated rapidly to 200° C., where it sinters, and then slowly, the compound melts at 206–208° C., with decomposition, to a black viscous liquid, which becomes more fluid on further heating. The compound is soluble in 2500 times its weight of boiling water and something over 50,000 times its weight of water at 20° C. It may be recrystallized from water, i-propyl alcohol and the like. Paper sensitized with the compound and dimethylformamide according to the disclosure of my copending application Serial Number 648,791, prints out a blue-violet image on irradiation with ultraviolet of wave lengths shorter than 3400 A. The absorption band of the dye forming this image is unsymmetrical and falls off more sharply on the long wave length side than on the short wave length side. As a result, the hue of the image varies somewhat with the depth of image, becoming redder as the image becomes darker. In the Munsell notation, a characteristic image hue is approximately 7.5 PB at a value of 6–7.

The substances intermediate between the compound described above and the parent unalkylated p-rosaniline cyanide contain from one to five hydroxyethyl substituents on the amino groups, and on photolysis yield colors ranging from magenta to violet, depending on the number of hydroxyethyl groups in the molecule. These substances are less crystalloidal, tend to form amorphous solids, especially in mixtures, and colloidal suspensions in aqueous solvents. For these reasons, these intermediate hydroxyethyl derivatives are often preferable for the preparation of photosensitive systems with hydrocolloids in which high concentrations can be maintained without formation of the larger aggregates in which the hexa-($\beta$-hydroxyethyl)-p-rosaniline cyanide crystallizes so readily.

While the hydroxyethyl group is quite satisfactory for the formation of hydrophilic dye cyanides, other hydroxyalkyl groups such as hydroxypropyl, chlorohydroxypropyl and dihydroxypropyl, may be used.

The hydroxyalkyl dye cyanides may be prepared by the action of an alkali cyanide upon the corresponding hydroxyalkyl dye. However, for the production of photosensitizers for practical use, I prefer to prepare them by the hydroxyalkylation of the primary amino dye cyanides because this method provides generally a mixture of isomers whose aggregate solubility is greater than that of the individual molecular species. The syntheses may be carried out by the use of the conventional hydroxyalkylating agents, such as ethylene oxide, propylene oxide, glycide, epichlorohydrin, and other alkylene oxides, ethylene chlorohydrin and other chlorohydrins.

The hydrophobic dye cyanide prototypes from which the hydrophilic hydroxyalkyl dye cyanides may be considered to be derived, are preferably the para diamino and triamino triphenylacetonitriles, such as 4,4'-diamino-triphenylacetonitrile, 4,4',4'', - triamino - triphenylacetonitrile, 4,4',4'' - triamino - 3 - methyl - triphenylacetonitrile, 4,4',4''-triamino-3,3',3''-trimethylacetonitrile.

The new hydroxyalkyl dye cyanides disclosed herein are represented by the following general formula:

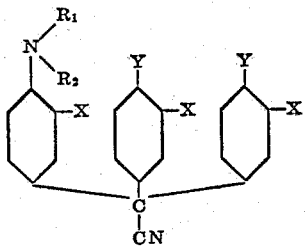

wherein X is selected from the class consisting of hydrogen and a methyl group; $R_1$ is selected from the class consisting of an alkyl group having at least one hydroxy substituent, and an alkyl group having at least one hydroxy and at least one halogen substituent; $R_2$ is selected from the class consisting of hydrogen and of the members of the class from which $R_1$ is selected; and Y is selected from the class consisting of hydrogen, —NH₂, and

wherein $R_1$ and $R_2$ have the meaning defined above. $R_1$ and $R_2$ may comprise either the same or different groups or may be different isomeric forms of the same general group.

The nature of the hydrophilic dye cyanides may be clearer from the following examples, which are carried out in the absence of ultraviolet radiation.

*Example 1*

A solution of 5 g. of 4,4',4''-triamino-triphenylacetonitrile, in 100 ml. of ethylenechlorohydrine is boiled under a reflux condenser for one-half hour. After the refluxing, 80 to 85 ml. of the ethylenechlorohydrine is distilled off. The residue in the still is dissolved in 100 ml. of water and treated with a solution of 10 g. of sodium carbonate monohydrate in 50 ml. of water, whereupon the hydroxyethylated p-rosaniline cyanide is precipitated as an amorphous mass. This is washed with 50 ml. of water and air-dried or dried in vacuo over sulfuric acid. The dry material is little sensitive ot radiation. It is primarily tri-$\beta$-hydroxyethyl-p-rosaniline cyanide and is a mixture of compounds having the formulae

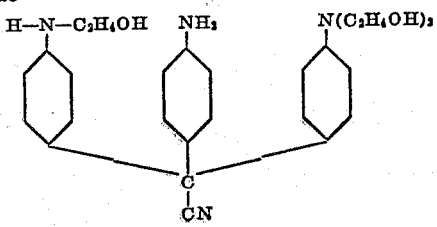

and

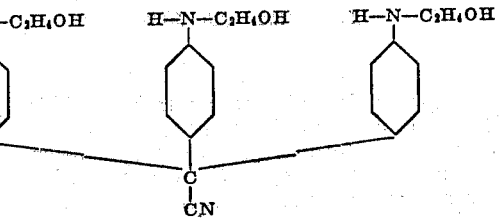

In combinations with water and alcohols it gives photosensitive systems that produce a reddish purple color on irradiation with ultraviolet.

*Example 2*

A solution of 5 g. of the product of Example 1 in 100 ml. of ethylenechlorohydrine is boiled under a reflux condenser for one-half hour and 80 to 85 ml. of the solvent distilled off as in Example 1. The residue is dissolved in 100 ml. of water and the dye cyanide precipitated by the addition of a solution of 10 g. of sodium carbonate monohydrate in 50 ml. of water. The precipitated amorphous material is washed with a little water and dried. It is largely hexa-$\beta$-hydroxy-ethyl-p-rosaniline cyanide having the formula

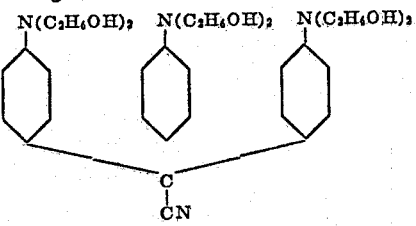

It forms photosensitive systems that yield a blue-violet color on irradiation with ultra-violet.

In both of the above examples the period of heating with ethylenechlorohydrine may be reduced to give less highly hydroxyethylated forms than the final products of the examples, and these yield on irradiation of their photosensitive systems colors that are redder than those produced by the compounds described in Examples 1 and 2.

These compounds may also be prepared by the reaction of p-rosaniline cyanide with ethylene oxide, preferably in presence of water, which acts as a catalyst, with or without an inert solvent, such as triethyl phosphate. This reaction generally gives higher yields of the pure hexa-$\beta$-hydroxyethyl-p-rosaniline cyanide, whose properties were described earlier in this specification. Similar alkylene oxide reactions are illustrated in Examples 4, 5, 6 and 7 below.

*Example 3*

Three g. of finely powdered rosaniline cyanide is suspended in a mixture of 9 ml. of ethylene chlorohydrin and 9 ml. of water, which is boiled under a reflux condenser. After about 1 hour all of the rosaniline cyanide will have gone into solution. Boiling is continued for for 1½ hours longer to a total boiling period of 2½ hours. The solution is then cooled to 25° C., diluted with 200 ml. of water and 10 ml. of a saturated aqueous sodium chloride solution and allowed to stand overnight. The solution is then filtered through infusorial earth to remove an amorphous brown material and the filtrate made weakly alkaline with 20 ml. of 1.6 N sodium carbonate solution, which produces a voluminous, light-colored, curdy precipitate. After standing overnight, the precipitate is collected on a filter and washed with water. The wet material has properties of an emulsion and, if warmed, readily synerizes, releasing water and forming a residue which dries to a brittle, glassy material. If, however, the wet precipitate is dried in a vacuum desiccator over sulfuric acid at a temperature not above 25° C., it forms a friable mass that is easily broken up into a powder. This, for most purposes, is more convenient to handle than the glassy form. The material is largely trihydroxyethyl - 4,4',4" - triamino - 3 - methyl - triphenylacetonitrile, which occurs in several isomeric forms:

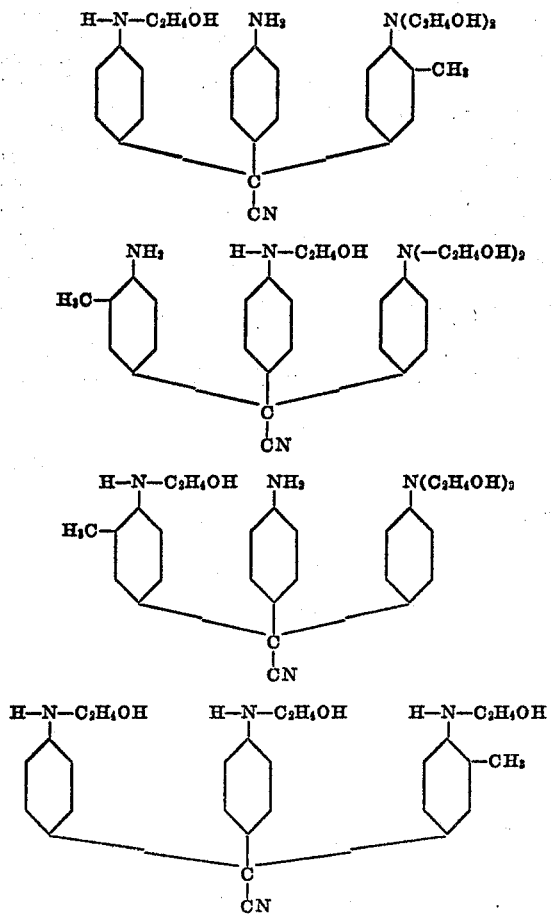

This material, when combined with gelatin, polyvinyl alcohol, etc., as disclosed in copending application Serial Number 542,479, gives photosensitive products that print out a bluish magenta image.

In this reaction, the water does not appear to act as a catalyst as it does in reactions of alkylene oxides with amines, but it moderates the reaction and seems to reduce the amount of by-products formed.

Example 4

To a solution of 2.5 g. of p-rosaniline cyanide in 100 ml. of propylene oxide at 25° C. is added 5 ml. of water. The mixture is kept in a closed flask for 5 weeks at 20° C. The excess propylene oxide is then evaporated from a water bath heated to 50° C. To the residual reaction product and water is added 3 ml. of concentrated hydrochloric acid and 3 ml. of water, and the mixture stirred at 25° C. until the dye cyanide has dissolved. The solution is filtered, diluted with three times its volume of water, cooled to 10° C. and made alkaline with ammonium hydroxide to precipitate the dye cyanide. The precipitation is carried out in the cold so as to obtain the curdy type of precipitate described in Example 3 rather than a tar. The precipitate, which will synerize and leave a glassy product if warmed, is dried in a vacuum desiccator over sulfuric acid at 20° C. It consists largely of tetra-β-hydroxypropyl-p-rosaniline cyanide, which exists in the isomeric forms:

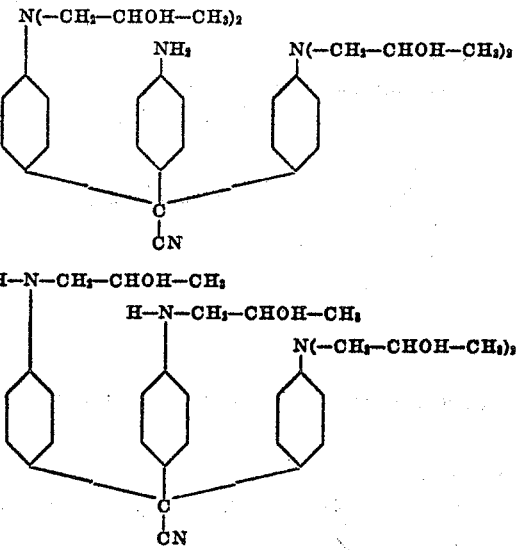

(In addition to the major β-hydroxypropyl derivatives, there is also formed some β-hydroxypropyl compound with the amino groups attached to the β carbon atom, and mixtures of the two in one molecule giving small quantities of many isomers.)

The product forms photosensitive systems with hydrocolloids, and also with oily photoactivators, which yield a violet color on irradiation with ultraviolet.

Example 5

Ten g. of rosaniline cyanide is dissolved at 25° C. in 250 ml. of propylene oxide, and 10 ml. of water is added to the solution. The mixture is kept in a sealed flask at 20° for 5 weeks. The excess propylene oxide is then evaporated from a water bath heated to 50° C. The residue is dissolved in a mixture of 10 ml. of concentrated hydrochloric acid and 10 ml. of water at 25° C. The solution is filtered, diluted with 3 times its volume of water, cooled to 10° C., and made alkaline with ammonium hydroxide. After standing overnight the precipitate is collected on a filter, washed with water and dried in a vacuum desiccator over sulfuric acid. The product is largely di-hydroxypropyl rosaniline cyanide containing

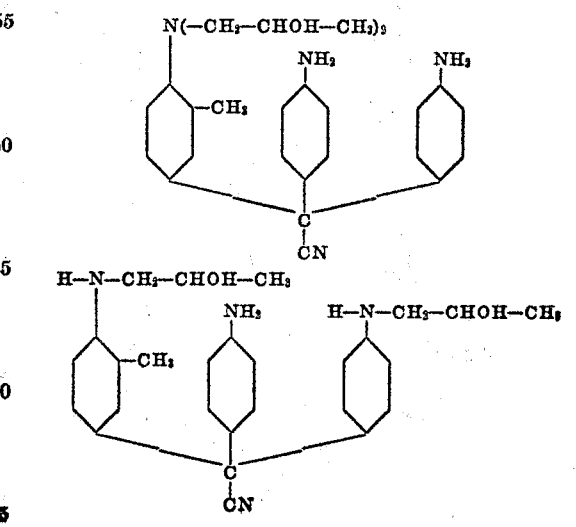

[structures shown on left column]

with smaller quantities of other isomers, such as

[structures shown]

along with the corresponding p-rosaniline cyanide derivatives resulting from the p-rosaniline always present in the commercial rosaniline as well as small amounts of the mono- and tri-propanol derivatives.

The product forms photosensitive systems with hydrocolloids, and also the hydrophobic photoactivators, which print out a magenta color on exposure to ultraviolet.

It will be noted that in this example a smaller proportion of water was used in the reaction mixture than in Example 4. Since water catalyzes the reaction, the small proportion resulted in a lower reaction rate and a less highly hydroxypropylated product than in the preceding example.

*Example 6*

Ten g. of the cyanide of New Fuchsine, Color Index No. 678, prepared as disclosed in my copending patent application Serial Number 594,687, now Patent No. 2,829,149, is dissolved in 200 ml. of propylene oxide at 25° C. and mixed with 20 ml. of water. It will be noted that the ratio of water to dye cyanide is twice that used in the preceding example.

The solution is kept in a sealed flask at 20° C. for 5 weeks. The propylene oxide is then distilled off at 50° C. The residue is dissolved in a mixture of 10 ml. of concentrated hydrochloric acid and 20 ml. of water. The solution is diluted with twice its volume of water and filtered. The filtrate is cooled in an ice bath, made alkaline with ammonium hydroxide, and allowed to stand overnight. The precipitate is collected, washed with water and dried in vacuo over sulfuric acid at room temperature. It is largely the tetrapropanol derivative of New Fuchsine cyanide, containing mianly the isomers,

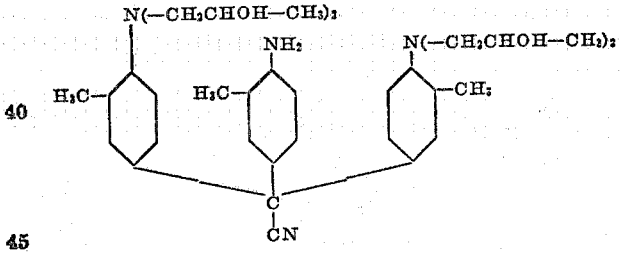

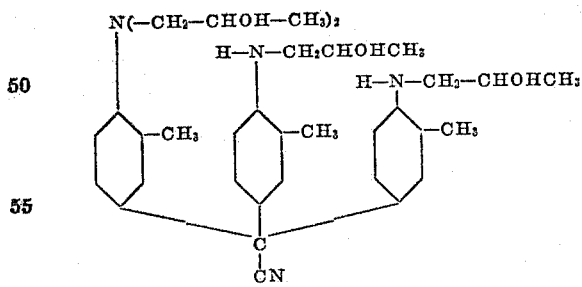

with smaller quantities of other isomers, such as,

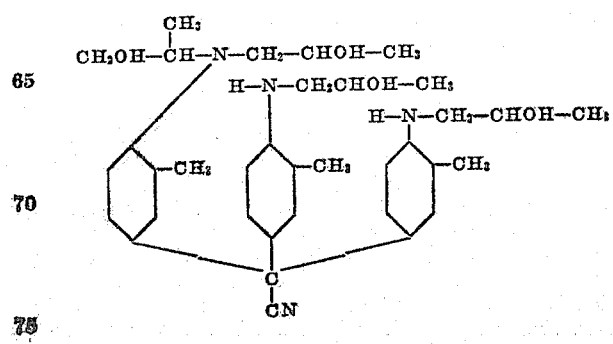

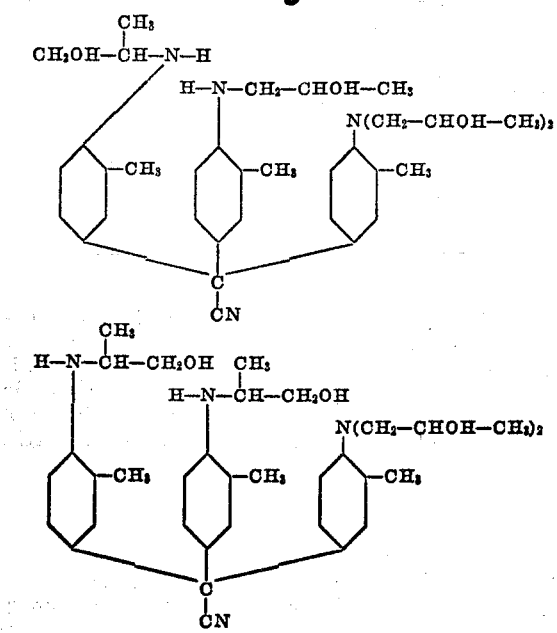

and some tri- and pentapropanol derivatives.

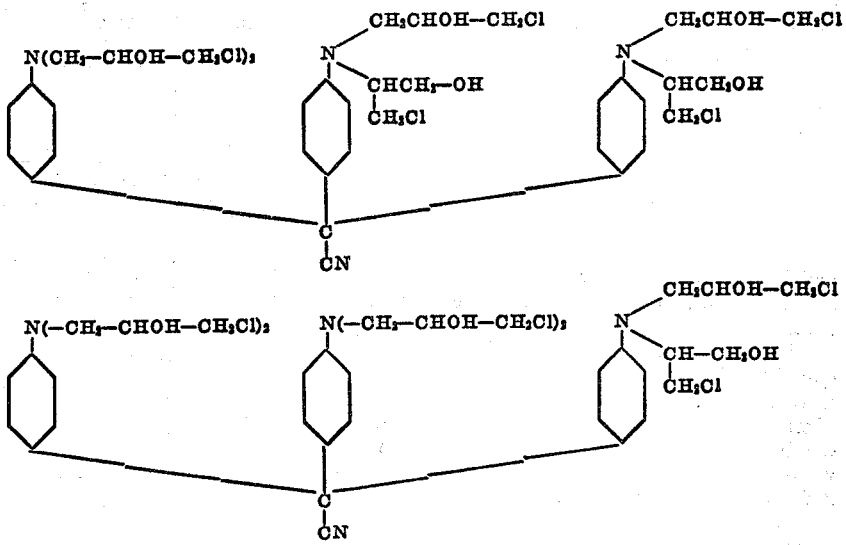

The color developed by ultraviolet irradiation of mixtures with hydrocolloids or other photoactivators is violet.

Example 7

Five g. of powdered p-rosaniline cyanide, 13.5 g. of epichlorohydrin, 20 ml. of 91% i-propyl alcohol and 5 ml. of water are mixed and the liquid boiled under a reflux condenser for six hours. The p-rosaniline cyanide all goes into solution during the first hour of boiling. The solution is transferred to a distilling flask with 10 ml. of 91% i-propyl alcohol, and 30 ml. of water added. The addition of the water precipitates an oily material. The remaining epichlorohydrin and solvents are then vacuum distilled under a pressure of 3 cm. of mercury, the temperature of the flask being raised gradually to 70° C.

Twenty ml. of concentrated hydrochloric acid and 3 ml. of water are added to the residue in the flask and stirred gently at 25° C. until the resinous solid has dissolved to form a syrupy liquid. Solution may require up to 12 hours. The solution is then poured into 800 ml. of violently stirred water at 20° C., whereupon a curdy precipitate forms due to the hydrolysis of the hydrochloride of the only slightly basic hexachloropropanol-p-rosaniline cyanide. This precipitate, like those in preceding examples, should be handled at not above room temperature if it is to be dried to a readily powdered solid rather than a glassy material. After standing overnight, the precipitate is collected on a filter, washed with water and dried in a vacuum desiccator over powdered sodium hydroxide. The product is primarily,

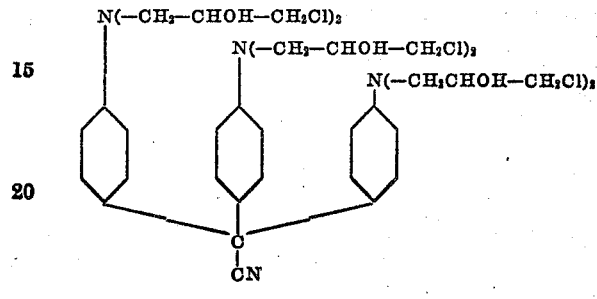

with smaller quantities of isomers such as,

The photosensitive systems with gelatin and nonaqueous photoactivators print out a blue color on irradiation by ultraviolet.

Example 8

Five g. of the product of Example 7 is refluxed in 250 ml. of 4 N aqueous sulfuric acid for 30 hours. The solution is diluted with 500 ml. of water, cooled to 0° C. and neutralized with a solution of 50 g. of sodium hydroxide in 200 ml. of water also cooled to 0° C. The resulting mixture is held in an ice bath for an hour, the curdy precipitate collected on a filter, washed with water and dried in a vacuum desiccator over sulfuric acid. The product is largely

N(—CH₂—CHOH—CH₂OH)₂
  N(—CH₂—CHOH—CH₂OH)₂
    N(CH₂—CHOH—CH₂OH)₂ and contains small quantities of such isomers as

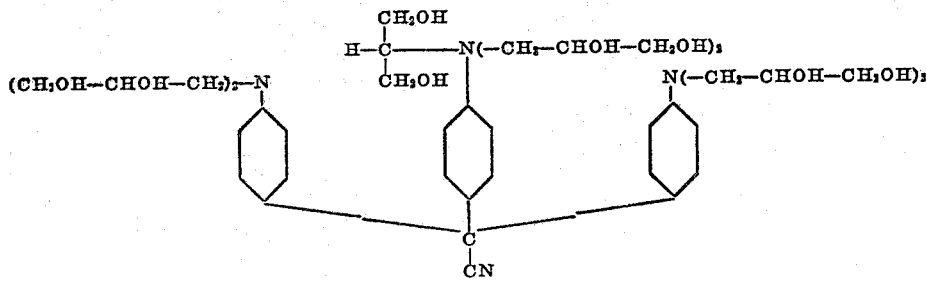

With hydrocolloids this product gives clear films that print a blue image.

Other procedures will suggest themselves to those skilled in the art. Thus, higher temperatures and pressures may be employed to accelerate the hydroxyalkylation reactions, glycide may be employed instead of the cheaper epichlorohydrin to produce the product of Example 8 directly without going through the intermediate chloropropanol derivative, etc.

Likewise, other homologous compounds may be prepared. Thus, N,N,-di-β-hydroxyethyl aniline can be condensed in the usual way with benzaldehyde to produce bis-di-β-hydroxyethylaminotriphenylmethane, which on oxidation yields the green dye N,N,N',N'-tetra-β-hydroxyethyl Doebner's Violet. This, by reaction with sodium cyanide, yields the dye cyanide

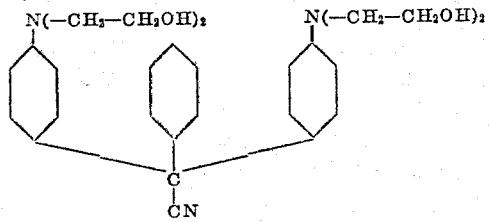

which on photolysis in presence of a photoactivator yields a green color. Other homologs are also readily prepared.

All of the hydroxyalkyl p-amino dye cyanides disclosed herein are both hydrophilic and non-ionic, may be activated by water alone, and form photosensitive combinations with hydrocolloids as well as with photoactivating hydrophobic systems. All forms of the new compounds provide photosensitive systems that responds to 3300 A. and shorter wave lengths.

It will be understood that the individual compounds of the product produced by hydroxyalkylation of the p-amino dye cyanides may be separated from each other by known separation methods if desired, e. g., by chromatography.

The present application is a continuation-in-part of my copending application Serial Number 550,773, filed December 2, 1955, now abandoned, and of my copending application Serial Number 542,479, filed October 24, 1955, now Patent No. 2,855,303.

I claim:

1. A hydrophilic cyanide of a p-amino triphenylmethane dye having at least one hydroxy lower alkyl radical attached to the nitrogen atom of a p-amino group.

2. A hydrophilic cyanide having the formula

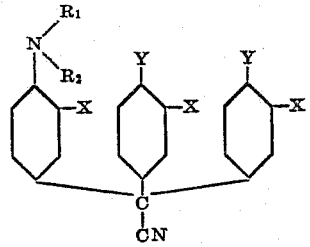

wherein X is selected from the class consisting of hydrogen and a methyl group; $R_1$ is selected from the class consisting of a lower alkyl group having at least one hydroxy substituent, and a lower alkyl group having at least one hydroxy and at least one halogen substituent; $R_2$ is selected from the class consisting of hydrogen and of the members of the class from which $R_1$ is selected; and Y is selected from the class consisting of hydrogen, —NH$_2$, and

wherein $R_1$ and $R_2$ have the meaning defined above.

3. P-rosaniline cyanide having at least one hydroxy lower alkyl radical attached to the nitrogen atom of a p-amino group.

4. Rosaniline cyanide having at least one hydroxy lower alkyl radical attached to the nitrogen atom of a p-amino group.

5. The cyanide of New Fuchsine, Color Index No. 678, having at least one hydroxy lower alkyl radical attached to the nitrogen atom of a p-amino group.

6. A hydrophilic dye cyanide composition comprising a mixture of isomers of p-amino triphenylacetonitrile having at least one hydroxy lower alkyl radical attached to the nitrogen atom of a p-amino group.

7. Hexa-(β-hydroxyethyl)-p-rosaniline cyanide.
8. Tri-(β-hydroxyethyl)-p-rosaniline cyanide.
9. Tri-(β-hydroxyethyl)-rosaniline cyanide.
10. Tetra-(hydroxypropyl)-p-rosaniline cyanide.
11. Di-(hydroxypropyl)-rosaniline cyanide.
12. Tetra-(hydroxypropyl)-New Fuchsine cyanide.
13. Hexa - (chlorohydroxypropyl) - p - rosaniline cyanide.
14. Hexa-(dihydroxypropyl)-p-rosaniline cyanide.
15. Tetra - (β - hydroxyethyl) - diamino - triphenylacetonitrile.

16. The method of preparation of a hydrophilic dye cyanide, comprising subjecting a p-amino-triphenylacetonitrile having a halogeno lower alkyl substituent on at least one amino group to hydrolysis in aqueous acid to change the halogen-alkyl substituent to an hydroxy lower alkyl substituent while leaving the nitrile group intact.

17. The process of forming a colored compound, comprising irradiating with ultraviolet energy in the presence of an activator, a hydrophilic cyanide of a p-amino triphenylmethane dye having at least one hydroxy lower alkyl radical attached to the nitrogen atom of a p-amino group.

18. The process of forming a colored compound, comprising irradiating with ultraviolet energy in the presence of an activator a hydrophilic cyanide having the formula

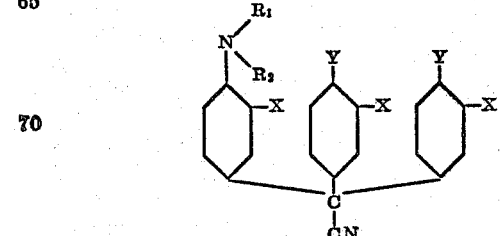

wherein X is selected from the class consisting of hydrogen and a methyl group; $R_1$ is selected from the class consisting of a lower alkyl group having at least one hydroxy substituent, and a lower alkyl group having at least one hydroxy and at least one halogen substituent; $R_2$ is selected from the class consisting of hydrogen and of the members of the class from which $R_1$ is selected; and Y is selected from the class consisting of hydrogen, $NH_2$, and

wherein $R_1$ and $R_2$ have the meaning defined above.

19. The process of forming a colored compound, comprising irradiating with ultraviolet energy in the presence of an activator, hexa-β-hydroxyethyl-p-rosaniline cyanide.

20. The process of forming a colored compound, comprising irradiating in the presence of an activator consisting of water a hydrophilic dye cyanide of a p-amino triphenylmethane dye having at least one hydroxy lower alkyl radical attached to the nitrogen atom of a p-amino group.

References Cited in the file of this patent
UNITED STATES PATENTS

| | | |
|---|---|---|
| 2,150,695 | Muehler | Mar. 14, 1939 |
| 2,325,037 | Chalkley | July 27, 1943 |
| 2,441,561 | Chalkley | May 18, 1948 |
| 2,469,682 | Dickey | May 10, 1949 |
| 2,726,252 | Balon | Dec. 6, 1955 |
| 2,732,337 | Togel | Jan. 24, 1956 |
| 2,734,027 | Nickerson | Feb. 7, 1956 |

OTHER REFERENCES

Fieser et al.: "Organic Chemistry," 3rd ed., page 575.